US011994691B1

(12) United States Patent
Burchett et al.

(10) Patent No.: US 11,994,691 B1
(45) Date of Patent: May 28, 2024

(54) LENS INSTALLATION SYSTEM, LENS MOUNT AND METHOD FOR OPTO-MECHANICAL LENS MOUNTING FOR HIGH-G SURVIVABILITY

(71) Applicant: LOCKHEED MARTIN CORPORATION, Bethesda, MD (US)

(72) Inventors: Chase M. Burchett, Winter Springs, FL (US); Jacob A. Diez, Orlando, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 212 days.

(21) Appl. No.: 17/708,425

(22) Filed: Mar. 30, 2022

(51) Int. Cl.

| | |
|---|---|
| ***G02B 27/62*** | (2006.01) |
| ***G02B 1/02*** | (2006.01) |
| ***G02B 7/00*** | (2021.01) |
| ***G02B 13/14*** | (2006.01) |

(52) U.S. Cl.
CPC ............... *G02B 27/62* (2013.01); *G02B 1/02* (2013.01); *G02B 7/008* (2013.01); *G02B 13/14* (2013.01)

(58) Field of Classification Search
CPC .......... G02B 27/62; G02B 1/02; G02B 7/008; G02B 13/14
USPC .......................................................... 359/356
See application file for complete search history.

(56) References Cited

U.S. PATENT DOCUMENTS

2004/0021951 A1* 2/2004 Maeda .................. G02B 27/62

* cited by examiner

*Primary Examiner* — Wyatt A Stoffa
*Assistant Examiner* — Mitchell T Oestreich
(74) *Attorney, Agent, or Firm* — Terry M. Sanks, Esq.; Beusse Sanks, PLLC

(57) ABSTRACT

A lens installation system that includes a tool for a keyhole in an imaging system housing. The tool includes a base having a first diameter dimensioned to fit below a lens housing cavity of an imaging system housing. The base has a top end forming a shoulder to seat the shoulder below the lens housing cavity. The tool includes a lens centering seat integrated with the base. The seat includes a ring and a recessed cavity within the ring. The ring is defined by an outer surface dimensioned to contact an inner diameter of an inner surface of the keyhole below the lens housing cavity, a first sloped surface providing a chamfered edge that is inclined for a distance above the outer surface, and a second sloped surface descending from an upper edge of the first sloped surface by a predetermined distance.

20 Claims, 11 Drawing Sheets

100

110

105

510
512
515
517
422
505
618
613
400

510
512
505
515
517
100
424
626
428
422
310

LENS INSTALLATION SYSTEM, LENS MOUNT AND METHOD FOR OPTO-MECHANICAL LENS MOUNTING FOR HIGH-G SURVIVABILITY

STATEMENT REGARDING FEDERALLY SPONSORED RESEARCH OR DEVELOPMENT

Development for this invention was supported in part under a contract awarded by the United States Army. The government may have certain rights in the invention.

BACKGROUND

Embodiments relate to an installation system, lens mount and method for opto-mechanical lens mounting for high-G survivability using the system to create the lens mount.

The performance of a lens to operate in certain wavelengths varies by the material. For example, an arsenic selenide (AMTIR-7) lens or other infrared compatible material may be used for infrared wavelengths, but can be destroyed during a cannon launch. A cannon launch can exert 10,000G+ forces on the lens and the material supporting the lens in the imaging system.

The performance of the lens provides a resolution of the target being captured by the imaging system. Destruction or damage of the lens significantly impacts the imaging system's ability to provide information about the target to accomplish a mission.

SUMMARY

Embodiments relate to an installation tool, lens mount and method for opto-mechanical lens mounting for high-G survivability using the tool to create the lens mount. The lens mount is configured to reduce the stress exerted on a lens caused by munitions launch.

An aspect of the embodiments includes a lens installation system that includes a tool for a keyhole in an imaging system housing. The tool includes a base having a first diameter dimensioned to fit below a lens housing cavity of an imaging system housing and in the keyhole. The base has a top end forming a shoulder to seat the shoulder below the lens housing cavity. The tool includes a lens centering seat integrated with the base. The seat includes a ring and a recessed cavity within the ring. The ring is defined by an outer surface dimensioned to contact an inner diameter of an inner surface of the keyhole below the lens housing cavity, a first sloped surface providing a chamfered edge that is inclined for a distance above the outer surface, and a second sloped surface descending from an upper edge of the first sloped surface by a predetermined distance.

An aspect of the embodiments includes a method of installing an infrared lens that includes installing a lens using a lens installation system in a lens housing cavity of an imaging system housing. The method includes forming a lens cradle for the lens in the imaging system housing, using a cradle material, the lens cradle wraps around a portion of the aft edge of the lens. The method includes removing a lens installation tool of the lens installation system after the lens cradle is formed.

Another aspect of the embodiments includes an imaging system comprising an imaging system housing having a lens cavity and a keyhole below the lens cavity. The imaging system includes a lens in the lens housing cavity and a lens cradle for the lens that wraps around a portion of an aft edge of the lens so that the lens is floated in the lens housing cavity by the lens cradle. The imaging system includes electro-optical hardware components configured to receive absorbed thermal energy of an electromagnetic radiation spectrum captured by the lens.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
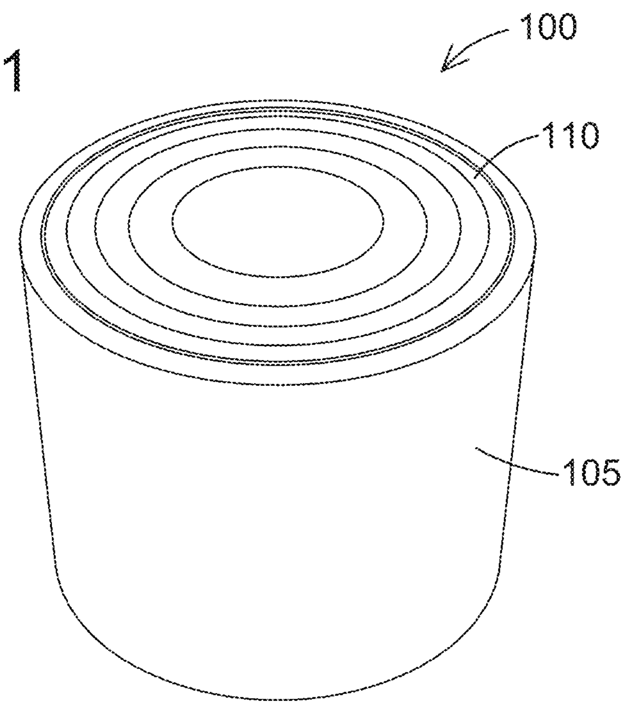
FIG. 1 shows an embodiment of a conventional lens.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Infrared lens materials, such as AMTIR-7 have a propensity to fail under inertial loads with a high-G magnitude. An embodiment includes an imaging system including a higher performing infrared (IR) lens and which is configured to reduce lens stress caused by inertial loads during gun launch, for example, by cradling the IR lens by an exclusively non-metallic interface which wraps around the aft edge of the lens.

The embodiments provide an exclusively non-metallic interface for mounting the lens and an installation system and installation process for manufacturing the non-metallic interface which enables lens survivability while maintaining optical accuracy. The non-metallic interface is configured to reduce lens stress by approximately 61% when compared to previous designs.

The embodiments herein increase the performance of the aperture of the IR lens in High-G optical products, such as guided munition seekers, so that the electro-optical hardware survives the 10,000G+ cannon launch. The performance includes a Modulation Transfer Function (MTF), resolution, pixels on target, and performance over temperature, for example, especially for our guided munition's applications.

FIG. 1 shows an embodiment of a conventional lens 100. The lens 100 has a generally cylindrical body 105 including optical material 110 for specific transmission, reflection, and/or absorption properties in an electromagnetic radiation spectrum. For example, some lenses include optical material 110 configured to capture one or more bands in the infrared wavelength spectrum of 780 nanometer (nm) to 1 millimeter (mm). The infrared frequency range is approximately 300 Gigahertz (GHz) to approximately 430 Terahertz (THz).

Figure 2:
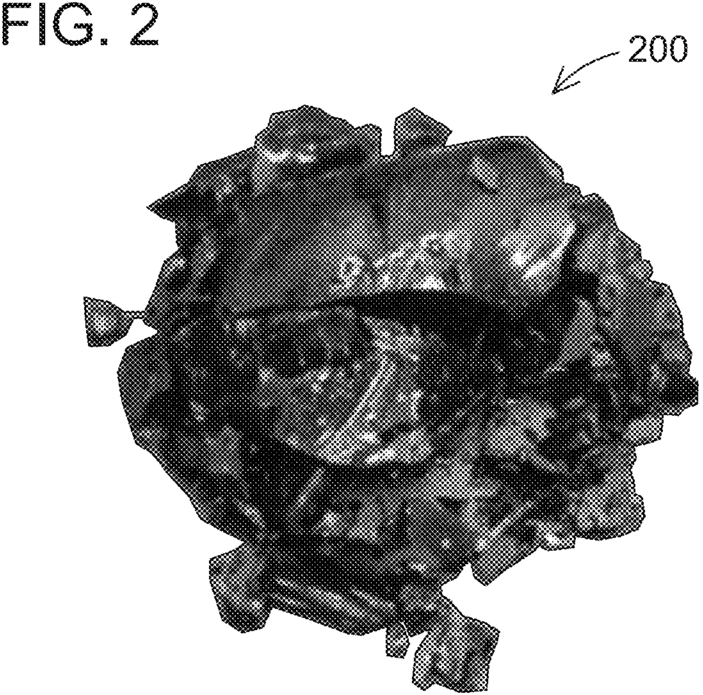
FIG. 2 shows a damaged conventional lens.

FIG. 2 shows a damaged conventional lens 200 after a launch of a system carrying the conventional lens.

Figure 3:
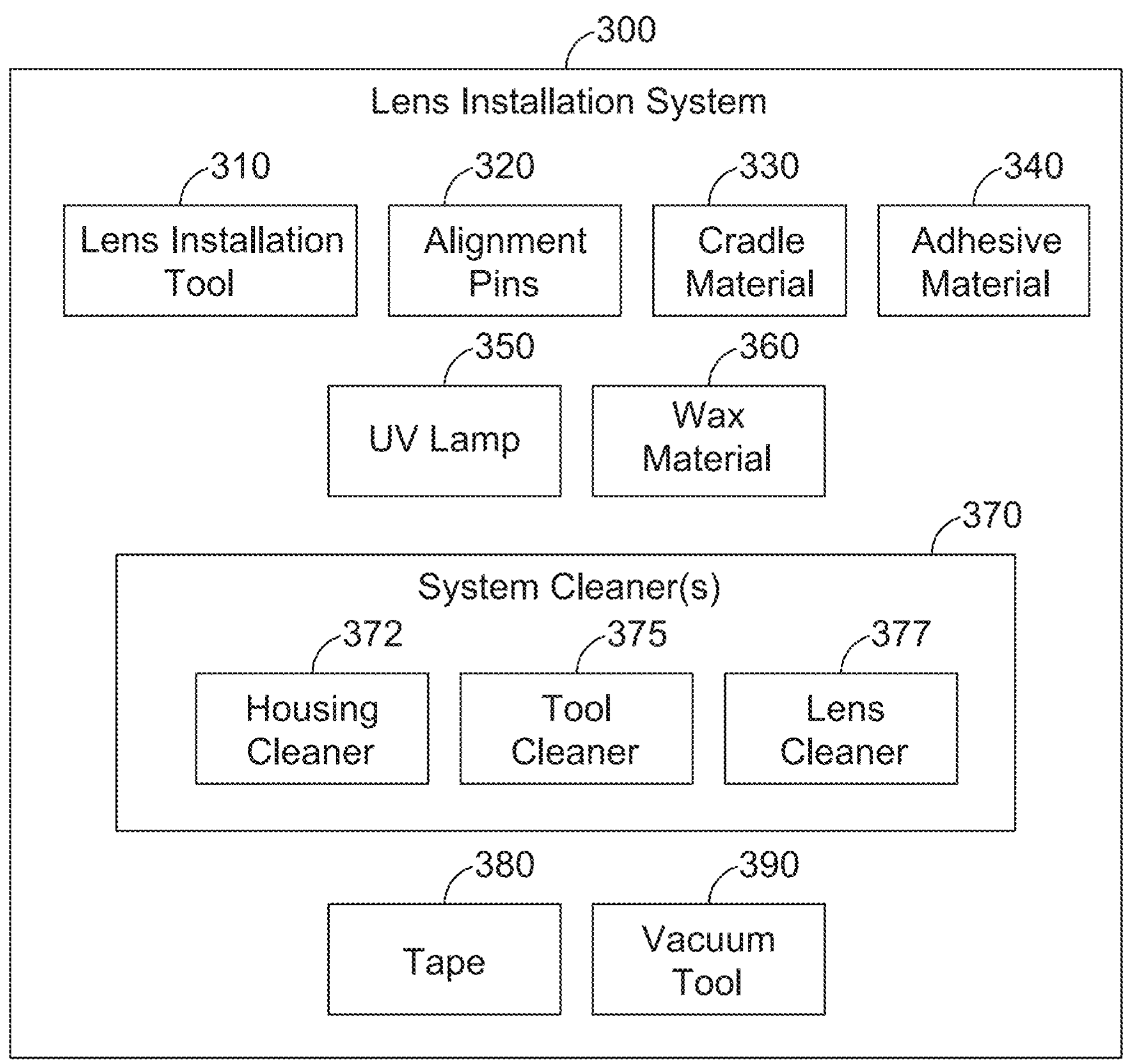
FIG. 3 shows a lens installation system.
Figure 5A:
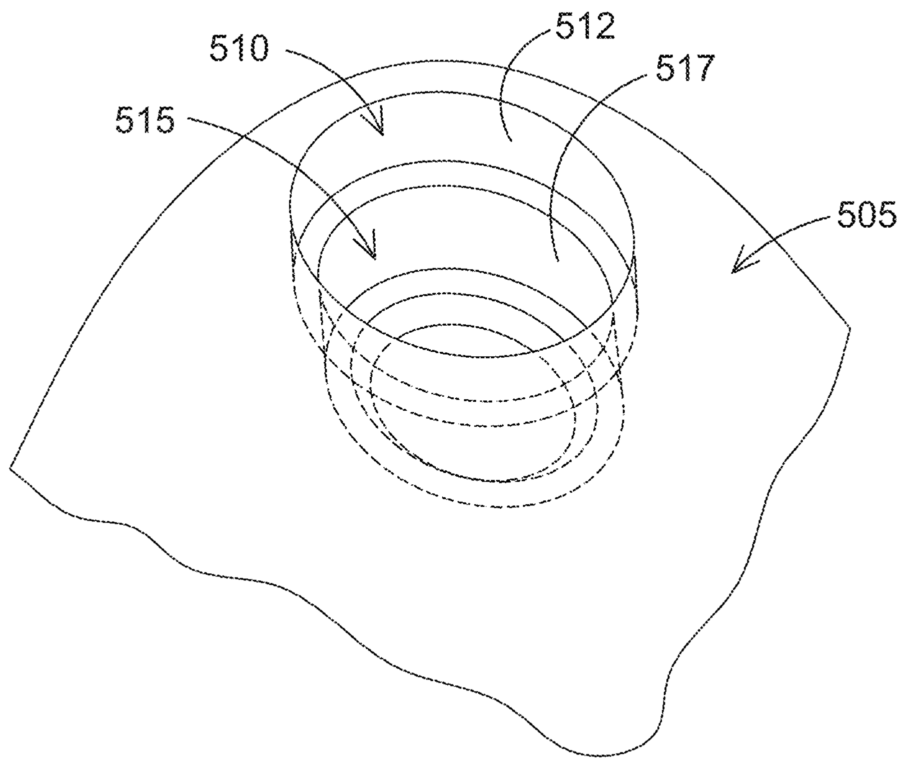
FIG. 5A shows a top view of the imaging system housing for cleaning.

FIG. 3 shows a lens installation system 300. The lens installation system 300 may vary based on the needs of the installer and the use of the system 300 to install a lens will be described also in relation to FIGS. 5A, 5B and FIGS. 6A-6F. The installer may have other materials or unused material that can be reused for an installation. FIG. 5A shows a top view of the imaging system housing 505 for cleaning.

Figure 4A:
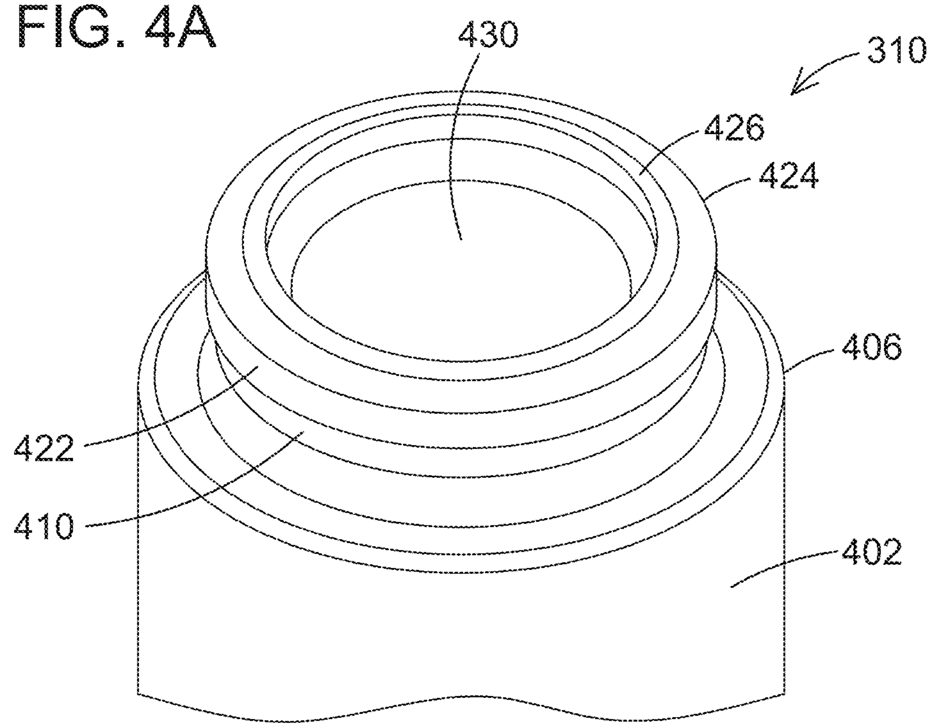
FIG. 4A shows a perspective view of a lens installation tool for installing the conventional lens in the imaging system.
Figure 4B:
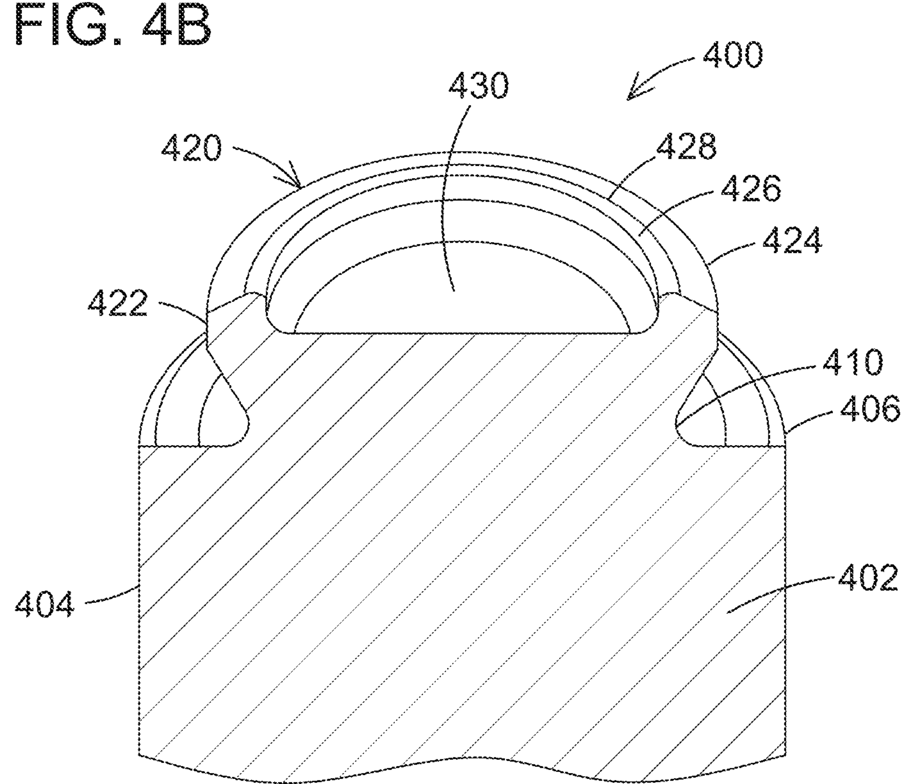
FIG. 4B shows a cross-sectional view of the lens installation tool of FIG. 4A.
Figure 5B:
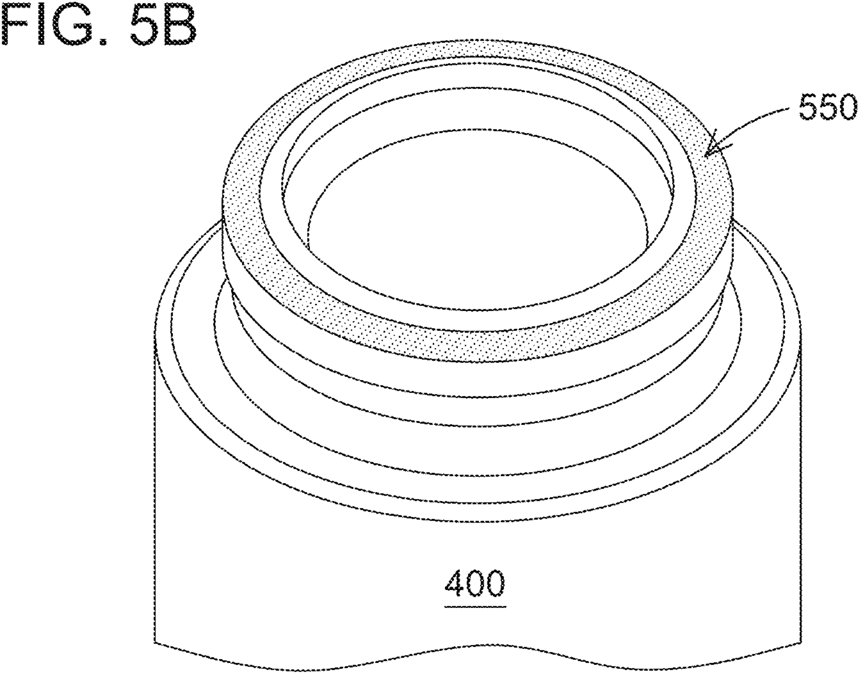
FIG. 5B shows a perspective view of the lens installation tool to be cleaned.
Figure 6A:
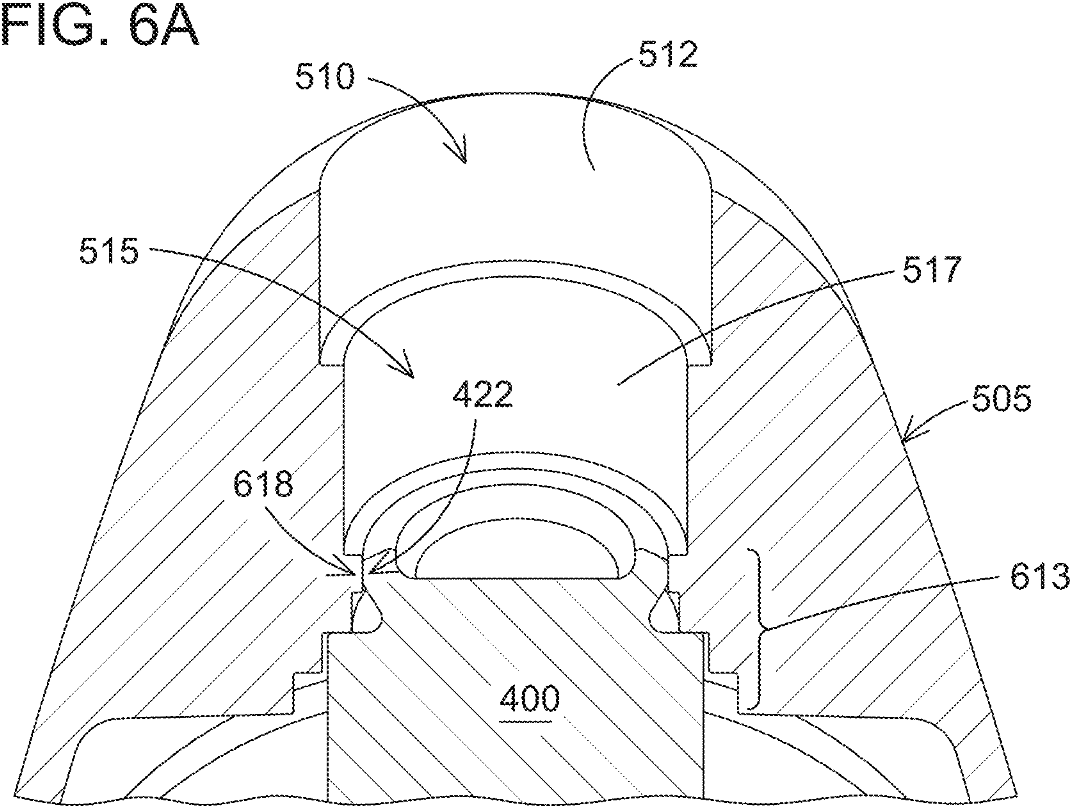
FIGS. 6A, 6B, 6C, 6D, 6E and 6F show steps for installing the conventional lens using the lens installation tool of the lens installation system.

The lens installation system 300 may include a lens installation tool 310, which is described in more detail in relation to FIGS. 4A, 4B and FIG. 5B. The lens installation tool 310 is configured to clock and key into an imaging system housing 505 (FIGS. 5A and 6A). The imaging system housing 505 (FIGS. 5A and 6A) may include at least one lens cavity 510 and 515. Each lens cavity is configured to house a respective one lens. In some embodiments, the lens installation system 300 only includes the lens installation tool 310.

The lens installation system 300 may include a plurality of alignment pins 320 configured to align the lens in the lens cavity 515. In some embodiments, the alignment pins 320 may be reused for other installations. As shown in FIG. 6C, the alignment pins 320 may be elongated cylindrical rods, for example. In some embodiments, the lens installation system 300 only includes the lens installation tool 310 and the alignment pins 320.

The lens installation system 300 may include cradle material 330, such as an epoxy configured to cushion, cradle and/or float the lens within the lens cavity 515 relative to inner surface of the lens housing cavity. The epoxy should be suitable for optoelectronic assemblies. By way of non-limiting example, the cradle material 330 may include OPTOCAST 3514, Manufactured by Electronics Material Inc. (used for tack bonding), and Loctite EA 9360 AERO for potting. This application is not limited to these specific epoxies. Others may be used for different lens materials and shapes so long as their properties are sufficient to withstand the environments of each application. Strength and durometer are two important properties to evaluate for the final assembly, and viscosity of the uncured epoxy should be considered for case of application. Recommended alternative epoxies for potting may include Loctite EA 9309 AERO, Loctite EA 9313 AERO. These epoxies have similar strength and hardness properties as 9360 while being less viscous. This helps the adhesive to flow and prevent any voids/pockets of air from developing around the lens.

The lens installation system 300 may include an adhesive material 340. The adhesive material may be used to back fill holes or the voids created from removal of the alignment pins 320.

The lens installation system 300 may include an ultraviolet (UV) lamp 350 to cure the adhesive material 340 using the UV lamp 350. The lamp 350 may include, by way of non-limiting example, Dymax 2000-EC Flood Lamp with intensity of 105 mW/cm2 and a UV range of 320-390 nm. There are numerous UV-cure adhesives available to use, including Dymax, MasterBond, and Permabond. By way of non-limiting example, the adhesive material 340 may include LOCTITE® EA 9360 Acro Epoxy Paste Adhesive (also known as Hysol EA 9360). In some embodiments, the UV lamp 350 may be reused for other installations.

The lens installation system 300 may include a wax material or PTFE spray 360 to coat a ring of the tool 310 prior to installation. The lens installation system 300 may include one or more system cleaners or cleaning solutions 370. The one or more system cleaners 370 may include at least one of an imaging system housing cleaner 372, a tool cleaner 375 and a lens cleaner 377. By way of non-limiting example, the housing cleaner 372 may include acetone or other cleaning solvent. The tool cleaner 375 may include an isopropyl alcohol (IPA) cleaning solvent, by way of non-limiting example. The lens cleaner 377 may vary depending on the lens. For example, to clean an AMTIR-7 lens, methanol may be used.

The lens installation system 300 may include a tape 380, such as a missile tape. The tape 380 may be used to tape or fasten the tool to the imaging system housing 505 to fix the tool relative to the housing 505 during assembly. The lens installation system 300 may include a vacuum tool 390 to insert the lens within the imaging system housing 505. The equipment used may include, by way of non-limiting example, Opto Alignment Technologies (OATi) Lens Handler model LCS-002.

FIG. 4A shows a perspective view of a lens installation tool 310 for installing the conventional lens in an imaging system and FIG. 4B shows a cross-sectional view of the tool of FIG. 4A. The tool 310 when keyed with the imaging system housing 505 forms a seal with the housing 505 and provides a chamfered edge to support the lens 100 (FIG. 1) to form with the cradle material 330 an exclusively non-metallic interface 660 (FIG. 6F). The interface 660 is configured to wrap around the aft edge of the lens 100 and extend along a length of the lens 100.

Figure 9A:
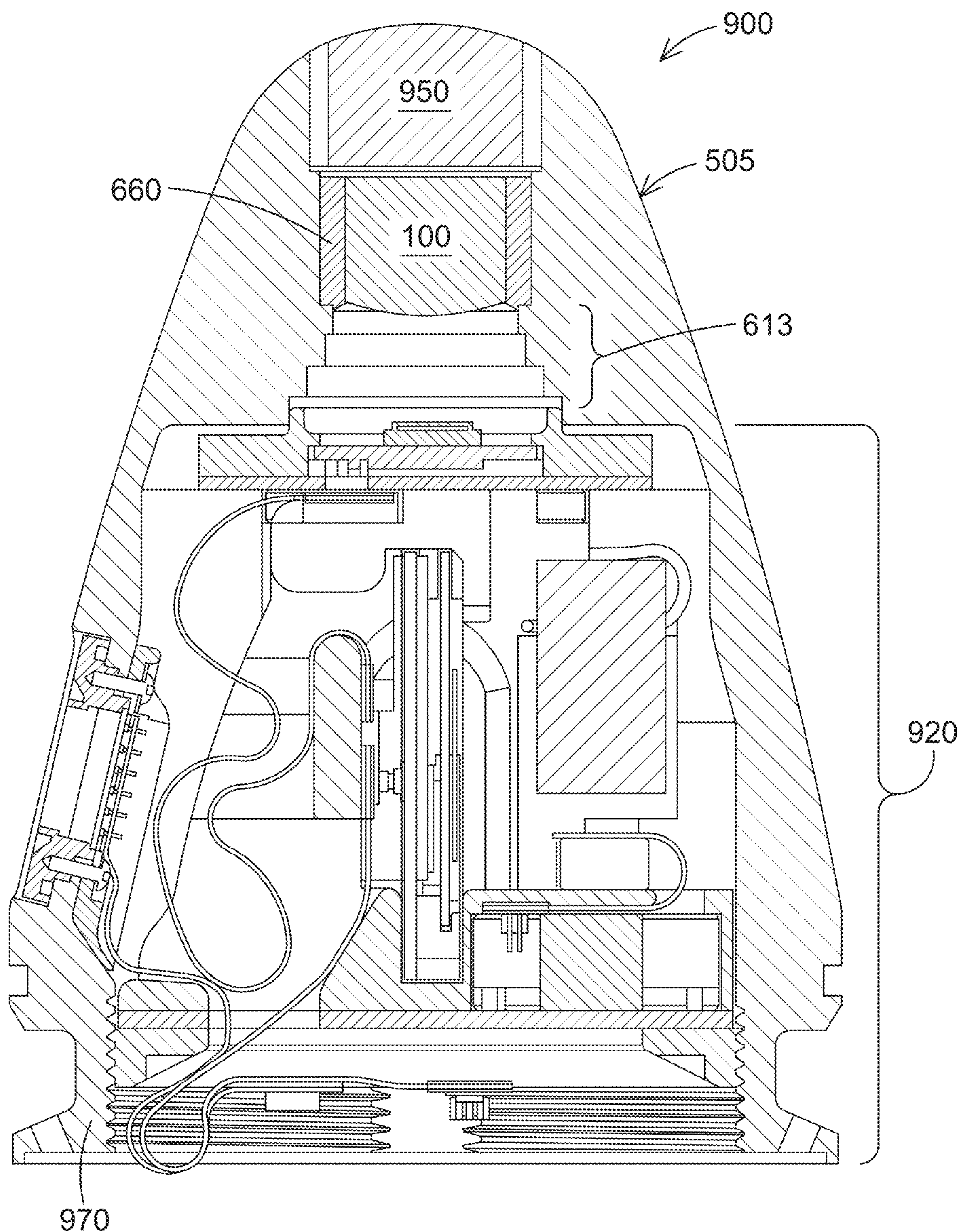
FIG. 9A shows an imaging system.

The lens installation tool 310 may be made of polytetrafluoroethylene (PTFE), known as TEFLON®. The lens installation tool 310 includes a base 402 having a first diameter dimensioned to fit below a lens housing cavity 515 (FIG. 5A) of an imaging system 900 (FIG. 9A). The base 402 may include a top end forming a shoulder 406 to seat the shoulder 406 below the lens housing cavity 515. The shoulder 406 provides a stop element or rest element for supporting the housing 505 on the shoulder 406 per the arrangement of keyhole 613 (FIG. 6A).

The lens installation tool 310 may include a lens centering seat 420 integrated with the base 402. The seat 420 includes a ring 422, 424, 426 and a recessed cavity 430 within the ring. The ring includes an outer surface 422 dimensioned to contact an inner diameter of an inner surface 618 (FIG. 6A) of tool keyhole 613 (FIG. 6A). The ring includes a first sloped surface 424 that is inclined for a distance above the outer surface 422 in a direction of a center axis of the tool. The ring may include a second sloped surface 426 descending in a direction of the center axis of the tool and from an upper edge of the first sloped surface 424 by a predetermined distance. The first sloped surface 424 provides a chamfered edge that joins the outer surface 422 and the second sloped surface 426. The second sloped surface 426 may be a beveled edge. The interface between the upper limit 428 of the chamfered edge (i.e., first sloped surface 424) joins with the second sloped surface 426 or beveled edge.

FIG. 5A shows a top view of the imaging system housing 505 for cleaning. In FIG. 5A, at least one lens cavity 515 of the imaging system housing 505 that needs to be cleaned is shown. Specifically, the inner surfaces 512 and 517 of the lens cavities 510 and 515, respectively, may be cleaned. After cleaning, the inner surfaces 512 and 517 are dried before proceeding. By way of non-limiting example, the inner surfaces 512 and 517 may be cleaned with the housing cleaner 372.

FIG. 5B shows a perspective view of the tool 310 to be cleaned and waxed. Specifically, the upper ring surfaces 550 with dotted hatching, are waxed. The upper ring surfaces 550 include the first sloped surface 424 and the sloped surface 426.

FIGS. 6A, 6B, 6C, 6D, 6E and 6F show steps for installing the conventional lens using the lens installation tool 310 of the lens installation system 300 to form a non-metallic interface 660.

FIG. 6A shows the tool 310 inserted and positioned in the imaging system housing 505. The tool 310 may be inserted after cleaning and drying phase, for example, of FIGS. 5A and 5B. Before inserting the tool 310, the tool may also be cleaned and waxed, as described in FIG. 5B. In some embodiments, the tool is placed on a support surface. Then the imaging system housing 505 is placed on the lens installation tool 310. The placement of the imaging system 505 on the tool 310 may align the keyhole 613 with the ring of tool 310, as shown.

The interface between the ring of tool 310 and the keyhole 613 at inner surface 618 is essentially closed so that viscous cradle material 330 added to from the interface 660 (FIG. 6F) does not generally flow between the surface 422 of the ring and surface 618 of the keyhole 613. After the tool 310 is installed, the lens 100 may be installed for example using a vacuum tool 390.

Figure 6B:
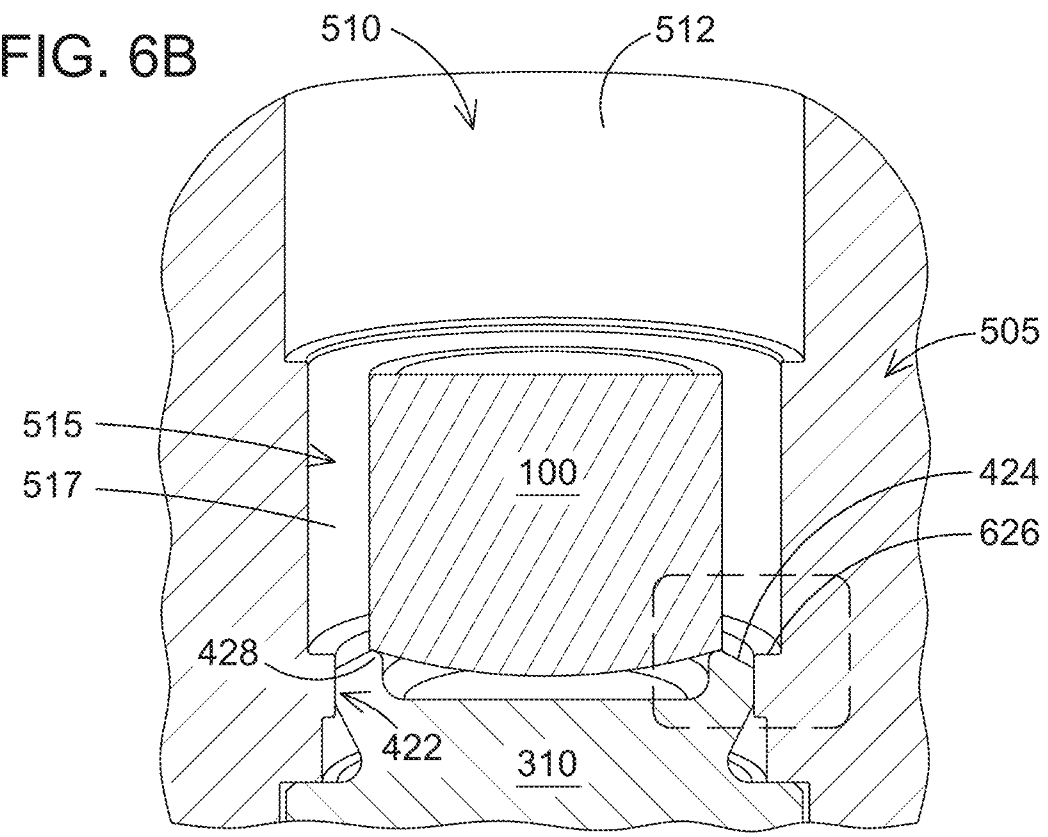
Figure 6C:
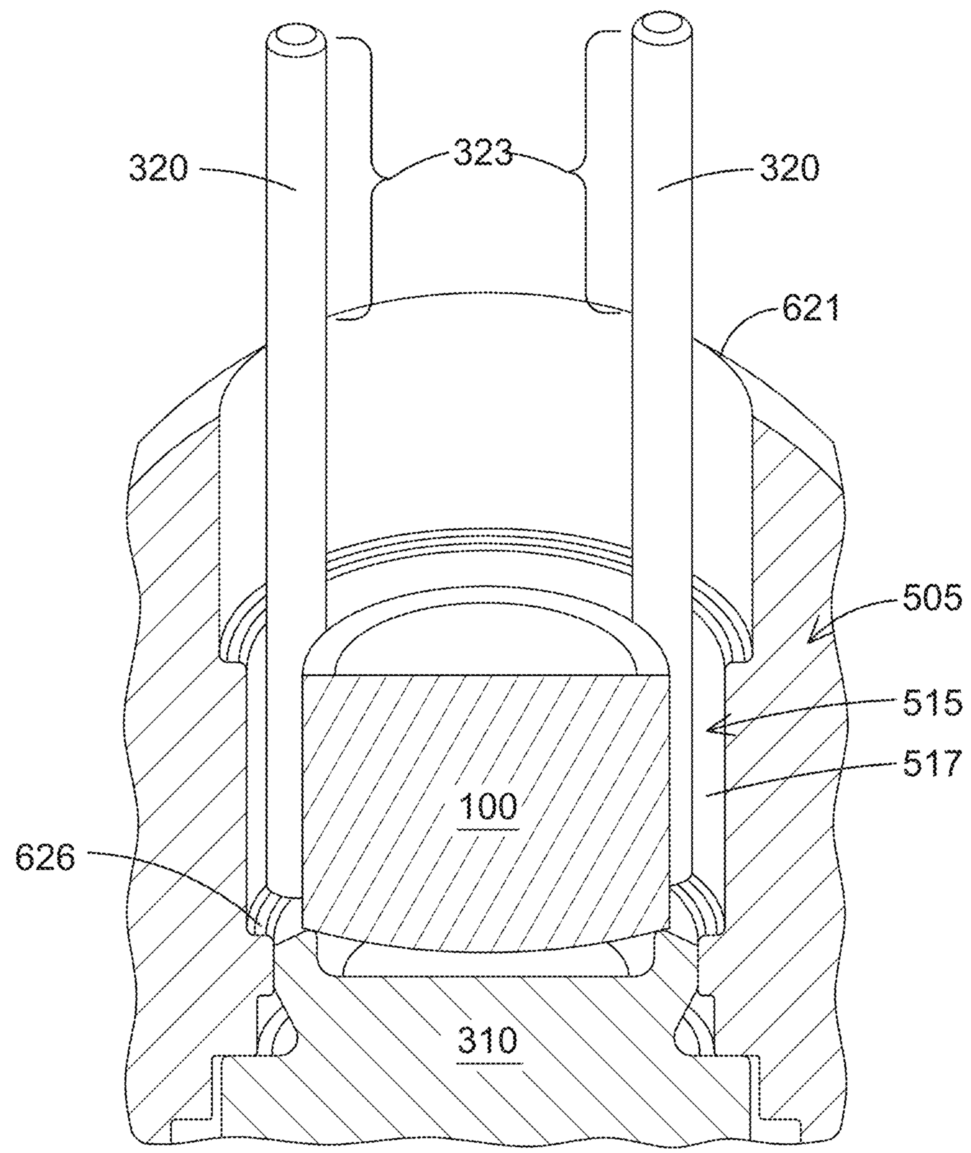
Figure 7:
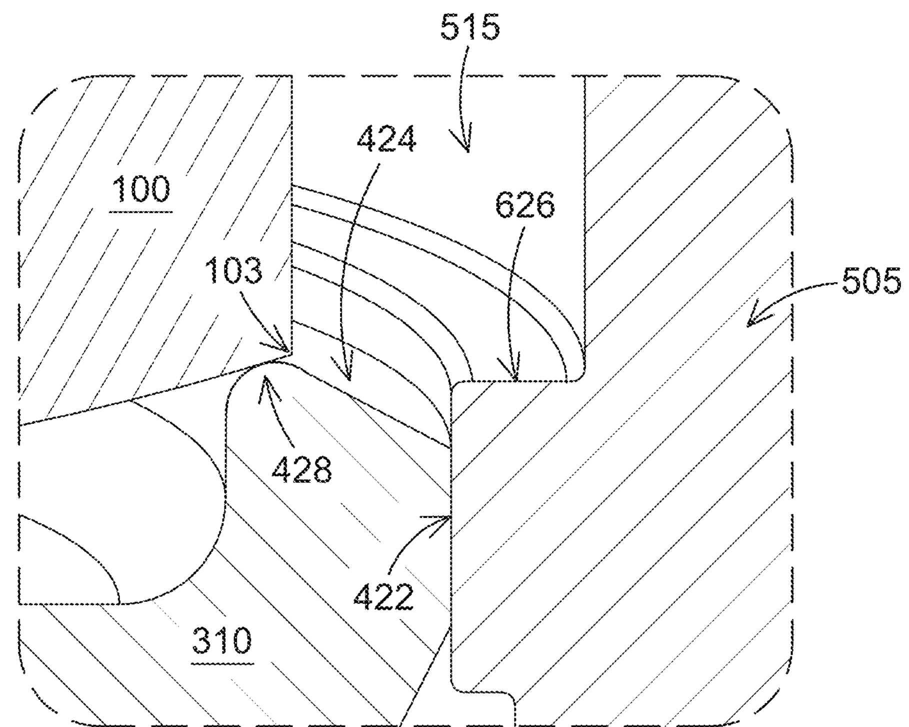
FIG. 7 shows a section of the image shown in FIG. 6B illustrating an aft of the lens relative to the chamfered edge.

FIG. 6B illustrates the lens 100 in a lens seat of the lens installation tool 310. FIG. 7 shows a section of the image shown in FIG. 6B illustrating an aft edge 103 of the lens 100 relative to the chamfered edge (i.e., first sloped surface 424). The cavity 515 includes a rib 626 that forms a seat for the interface 660. Although the aft edge 103 is wrapped, the aperture of the lens remains unobstructed and clear of installation materials. The top of surface 422 when keyed is positioned below the rib 626. Furthermore, the interface between the top of the surface 422 and the beginning of the chamfered edge (i.e., first sloped surface 424) also is positioned below the rib 626 when the tool 310 is keyed into position.

Figure 8:
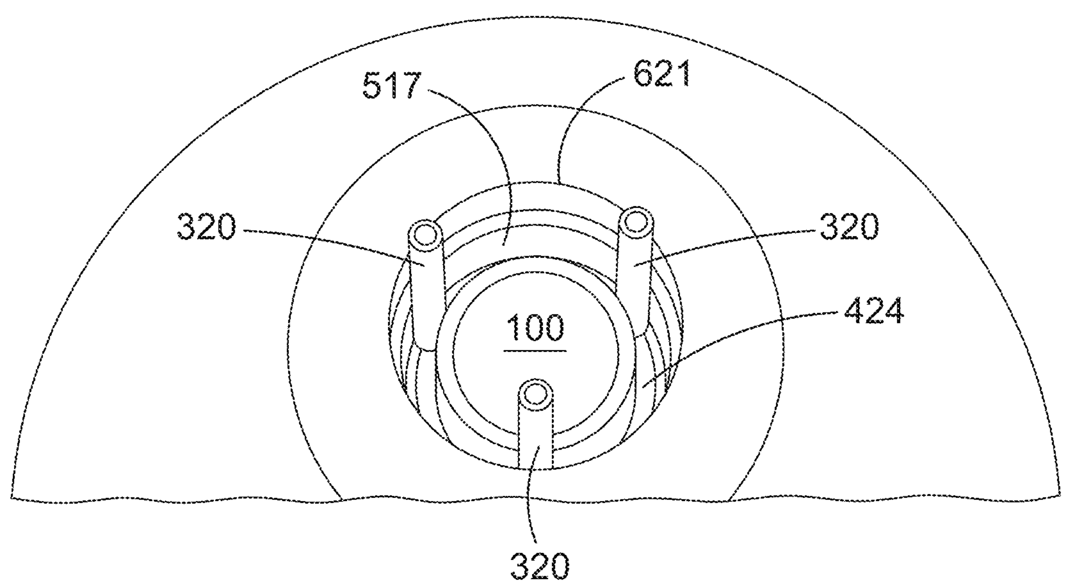
FIG. 8 a top view of the lens with the alignment pins installed according to the process of FIG. 6C.

FIG. 6C illustrates the step of installing the alignment pins 320 in the housing 505 to align the lens 100 in cavity 515. FIG. 8 shows a top view of the lens 100 with the alignment pins installed according to the process of FIG. 6C. The alignment pins 320 are installed in space relation relative to each other. The alignment pins 320 may be inserted in the gap between the inner surface 517 and the outer surface of lens 100. A distal end of the alignment pins 320 may be in direct contact with or rest on the top of rib 626. This provides support for the alignment pins 320. As shown, the length of the alignment pins 320 is longer than the distance from rib 626 and a top 621 of housing 505. The length also provides handles 323 for subsequent removal of the pins 320 during the installation process.

In FIG. 8, by way of non-limiting example, the plurality of alignment pins 320 may be spaced in equidistant intervals. In the example, there are three pins 320 spaced from each other by 120°. If more pins are used, the equidistant intervals may be less than 120°. In other embodiments, using less than three (3) pins may increase the interval to 180°.

Figure 6D:
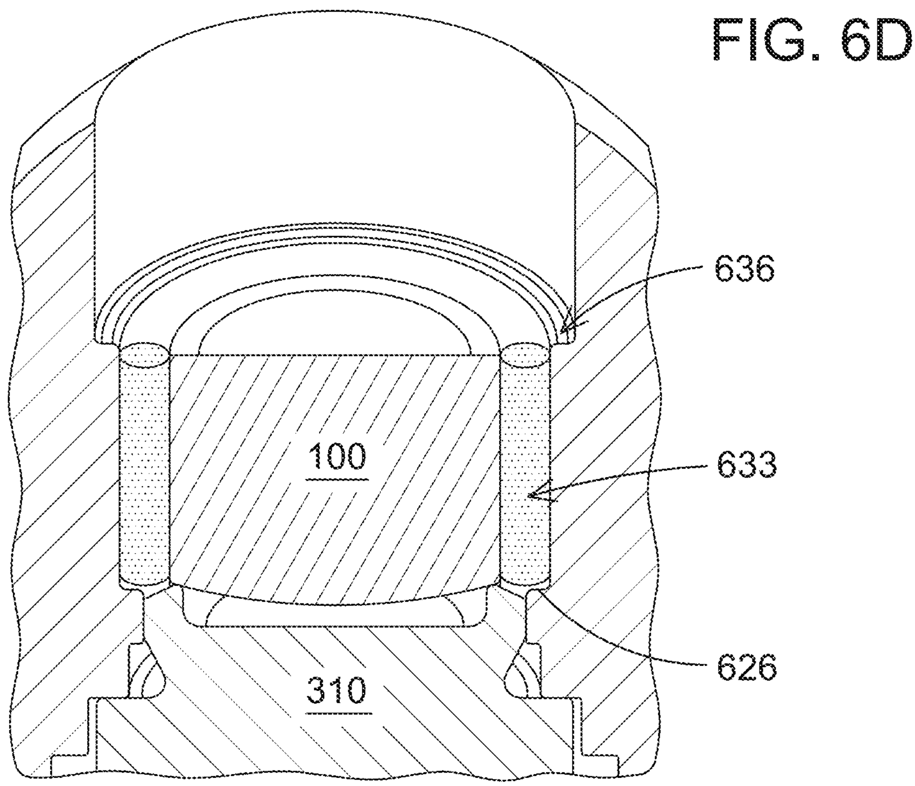

FIG. 6D illustrates the installation of the cradle material 330 and removal of the alignment pins 320. Once the alignment pins 320 are installed, as described in relation to FIG. 6C, the cradle material 330 is applied in the space between the alignment pins 320 up to the rib 636 demarcating the cavity 510 and 515. Once the cradle material 330 is set, alignment pins 320 may be removed using the handles 323. This creates holes 633 denoted in dotted hatching. The cradle material 330 should not encroach into cavity 510.

Figure 6E:
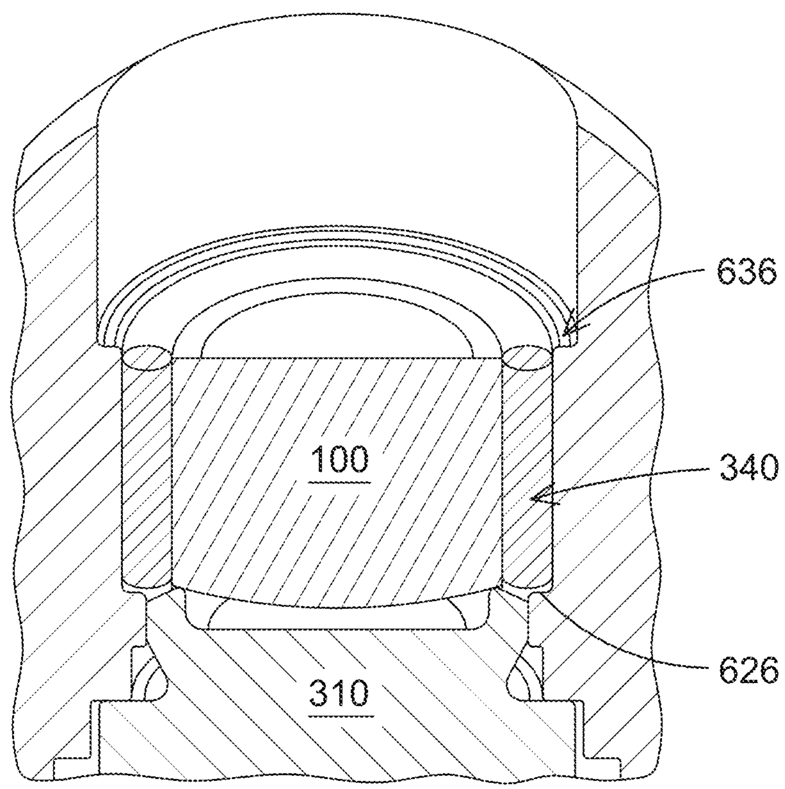
Figure 6F:
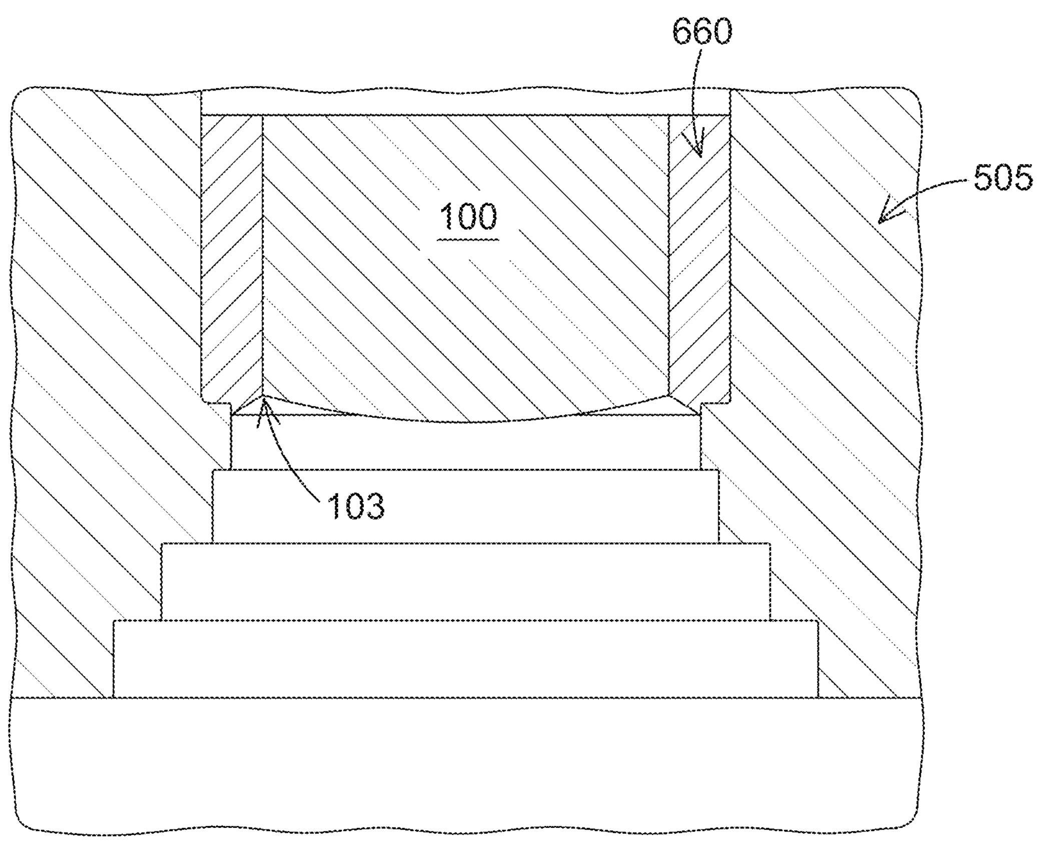

FIG. 6E illustrates the installation of the adhesive material 340 after the removal of the alignment pins 320. The adhesive material 340, denoted as diagonal hatching, may be filled in the holes 633 up to or slightly below the rib 636 so that the material does not encroach into cavity 510. The adhesive material 340 is set or cured. For example, a UV lamp 350 may be used by directing the UV light of the lamp 350 in the direction of the adhesive material 340 until cured. Any excess adhesive material may be removed. Then, the lens and imaging housing 505 are left to set or cure.

FIG. 6F illustrates the lens installation tool 310 removed from the imaging system housing 505 after the lens cradle (i.e., non-metallic interface 660) is formed. The wax material 360 allows the tool 310 to be detached from the cradle material 330 after the lens cradle is formed. The lens cradle (i.e., non-metallic interface 660) wraps around a portion of the aft edge of the lens 100. The lens cradle (i.e., non-metallic interface 660) is configured to reduce a stress force exerted on the lens by inertial loads during launch. The lens cradle eliminates a hard mounting surface since the lens sits on the epoxy. The lens 100 does not contact the surface of the rib 626 or the surface of rib 636, instead, the lens 100 is suspended in an epoxy. Accordingly, the lens 100 will not fracture by the impact forces exerted on the lens 100 by engaging hard surfaces of the housing 505 during launch from a cannon or other launch device of a guided munition.

Although not part of the installation process described above, a second lens may be installed in cavity 510.

Arsenic Selenide (AMTIR-7) lens 100 enables a long-wavelength infrared (LWIR) imaging system to perform properly over a required temperature range for launching a munition. The LWIR lens 100 is configured to survive 10,000 Gs of cannon launch acceleration experienced by a guided munition, when mounted in accordance with the non-metallic interface 660, described above. The LWIR range is approximately 8.0-14.0 μm (micrometer) wavelength range.

Figure 9B:
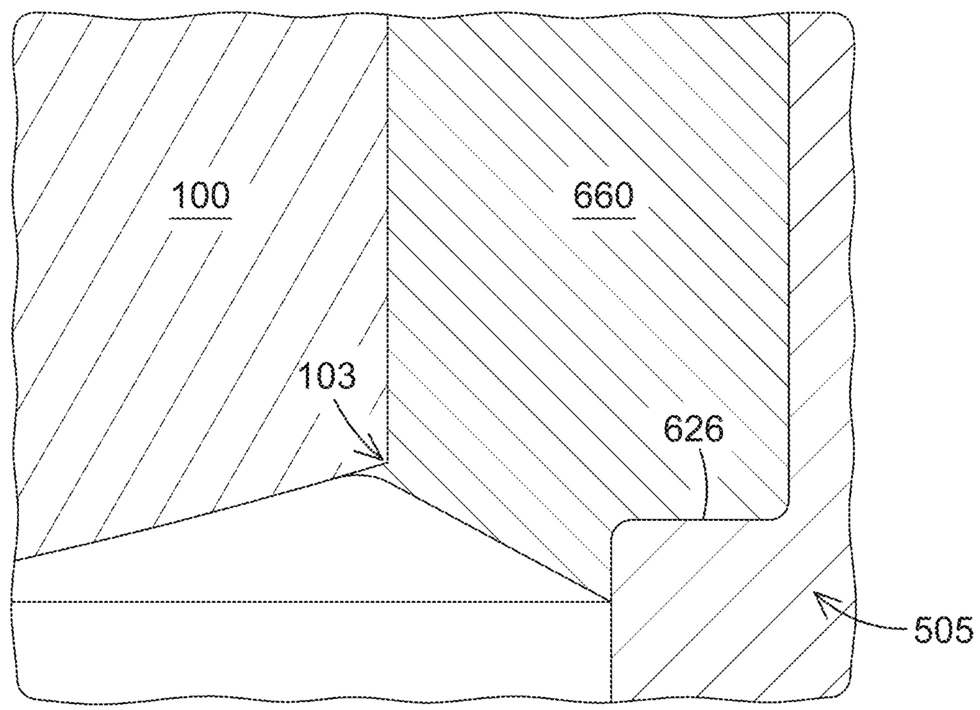
FIG. 9B shows the conventional lens installed in the imaging system of FIG. 9A.

FIG. 9A shows an imaging system 900 and FIG. 9B shows the conventional lens 100 installed in the imaging system 900 of FIG. 9A. The imaging system 900 may include lens 950 and lens 100 installed behind lens 950. By way of non-limiting example, lens 100 is an AMTIR-7 lens. The lens 950 may be a gallium arsenide (GaAs) lens. The lens 100 is installed using the non-metallic interface 660, described above. The imaging system 900 includes housing 505 with a keyhole 613. The housing 505 is made of a metal such as aluminum (Al). The non-metallic interface 660 is supported by rib 626 in housing 505, the interface 660 wraps the aft edge 103 of lens 100 so that the lens is supported by an epoxy material that has no hard surfaces.

The imaging system 900 may include electro-optical hardware components 920 for converting the light or thermal energy of an electromagnetic radiation spectrum received or absorbed by lenses 100 and 950 into image data. The imaging system 900 may be shipped for installation on the body of the guided munition. The electro-optical hardware components 920 are configured to withstand the high-G forces. The electro-optical hardware components 920 may include electronic imaging circuitry, batteries, and other guidance equipment used for flying objects such as an Inertial Measurement Unit (IMU).

One end of the imaging system 900 may include an interface 970 for attachment and connection of the imaging system 900 to the body of a launchable guided munition (not shown).

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including." "includes." "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another. As used herein the expression "at least one of A and B," will be understood to mean only A, only B, or both A and B.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

We claim:

1. A lens installation system, comprising:

a tool for a keyhole in an imaging system housing comprising:

a base having a first diameter dimensioned to fit below a lens housing cavity of the imaging system housing, the base having a top end forming a shoulder to seat the shoulder below the lens housing cavity; and a lens centering seat integrated with the base, the lens centering seat includes a ring and a recessed cavity within the ring, the ring defined by:

an outer surface dimensioned to contact an inner diameter of an inner surface of the keyhole below the lens housing cavity, a first sloped surface providing a chamfered edge that is inclined for a distance above the outer surface, and a second sloped surface descending from an upper edge of the first sloped surface by a predetermined distance.

2. The system according to claim 1, wherein the tool comprises polytetrafluoroethylene.

3. The system according to claim 1, further comprising a plurality of alignment pins, configured to align the lens in the recessed cavity of the lens centering seat.

4. The system according to claim 3, further comprising cradle material configured to cradle and float the lens within the lens housing cavity relative to an inner surface of the lens housing cavity.

5. The system according to claim 3, further comprising an adhesive material, the adhesive material used to back fill holes created from removal of the alignment pins.

6. The system according to claim 5, further comprising an ultra-violet (UV) lamp, wherein the adhesive is curable using the UV lamp.

7. The system according to claim 1, further comprising at least one cleaning solution to clean at least one of the tool, a lens surface of the lens, and the lens housing cavity of the imaging system.

8. A method of installing an infrared lens, comprising:
installing a lens using a lens installation system according to claim 1, in a lens housing cavity of an imaging system housing;
forming a lens cradle for the lens in the imaging system housing, using a cradle material, the lens cradle wraps around a portion of an aft edge of the lens; and
removing a lens installation tool of the lens installation system after the lens cradle is formed.

9. The method according to claim 8, further comprising, during the installing of the lens, aligning the lens with a plurality of alignment pins in the lens housing cavity.

10. The method according to claim 9, wherein the forming of the lens cradle includes:
installing an epoxy material in a gap between the lens and the lens housing cavity;
removing the plurality of alignment pins from the lens housing cavity; and
back filling holes with an adhesive material, the holes formed by removing the alignment pins.

11. The method according to claim 10, further comprising curing the adhesive material with an ultra-violet (UV) lamp.

12. The method according to claim 8, further comprising, prior to installing the lens in the lens housing cavity, cleaning at least one of the lens, the lens housing cavity and the lens installation tool.

13. The method according to claim 8, further comprising, prior to installing the lens in the lens housing cavity, inserting the lens installation tool into a keyhole of the imaging system housing below the lens housing cavity.

14. The method according to claim 8, wherein the installing the lens includes:
positioning the tool in a keyhole of the imaging system housing below the lens housing cavity.

15. An imaging system, comprising:
an imaging system housing having a lens cavity and a keyhole below the lens cavity;
a lens in the lens housing cavity;
a lens cradle for the lens that wraps around a portion of an aft edge of the lens so that the lens is floated in the lens housing cavity by the lens cradle; and
electro-optical hardware components configured to receive absorbed thermal energy of an electromagnetic radiation spectrum captured by the lens.

16. The imaging system according to claim 15, wherein:
the lens comprises arsenic selenide; and
the lens cradle configured to cushion the lens to withstand 10,000G forces.

17. The imaging system according to claim 15, wherein the lens cradle includes:
an epoxy material in a gap between the lens and the lens housing cavity; and
an adhesive material which back fills holes formed in the epoxy material.

18. The imaging system according to claim 15, wherein the lens is a first lens and further comprising a second lens installed forward the first lens in the imaging system housing.

19. The imaging system according to claim 15, wherein the imaging system housing further comprising an interface for attachment to a launchable guided munition.

20. The imaging system according to claim 15, wherein the lens captures wavelengths in a long-wavelength infrared (LWIR) range.

* * * * *